UNITED STATES PATENT OFFICE 2,495,497

METHOD OF LIQUID STABILIZATION OF NICKEL CATALYSTS

Jacob Elston Ahlberg and Clarence F. Hiskey, New York, N. Y., assignors to the United States of America as represented by the United States Atomic Energy Commission No Drawing. Application January 22, 1943, Serial No. 473,252

6 Claims. (Cl. 252—472)

This invention relates to a method for stabilizing catalysts and more specifically to the condensing of a fluid film on the surface of the catalyst to prevent the complete oxidation of a catalyst, such as nickel.

Reduced metal and supported metal catalysts have been found to be extremely effective for the promotion of hydrogenation and hydrogen exchange reactions. These catalysts have usually been prepared by reduction of particular compounds or mixtures of compounds or salts of the metal at elevated temperatures. After reduction the catalysts are usually pyrophoric so that when exposed to air they become extremely hot and oxidize. The activity of a catalyst after such oxidation is usually completely destroyed and their induced activating power cannot usually be restored without a repetition of the entire reduction process.

One purpose of the present invention is to develop a method of treating a catalyst so that it can be easily handled in air without danger to the operator and without injuring the catalyst. Another purpose is to retain the catalytic activity of such catalysts and stabilize such catalysts with respect to air in such a way that the activity may be easily and quickly restored when it is desired to use them.

Existing methods for stabilizing catalysts usually involve partial oxidation using very dilute mixtures of oxygen in the presence of nitrogen, which must be done under critical control of the gases to be completely effective, as described in the copending Hickey application, Serial Number 473,253 filed January 22, 1943, now abandoned, for an improvement in said method.

The present invention effects stabilization of the catalyst by condensing a vapor of a saturated gaseous stream or by depositing a film of liquid by direct contact on the surface of the catalyst, and then exposing the wet catalyst to the air until any desired amount of the liquid has evaporated.

The liquid film functions to prevent rapid oxidation of the metallic catalyst. Some oxidation does occur, although more slowly than otherwise, due in part to the diffusion of oxygen through the liquid film which is dependent to some extent on the particular liquid condensed or deposited on the surface of the catalyst.

Evaporation of the liquid film may proceed to dryness in the air or it may be stopped at any intermediate point desired. The oxidation is accompanied by no significant rise in temperature, although some heat is generated which is dissipated into the liquid film and so neutralized by the cooling effected in the evaporation of the film, as not to affect materially the remaining stored catalyst activity.

The net effect of wetting is that the partial oxidation is performed very slowly and accompanied by a small decrease in the activating power, however, leaving the catalyst with sufficient potential activating power or with the ability to recover a sufficient amount of necessary activity at reasonably low temperatures.

The liquid film may be produced by any fluid which does not react with reduced nickel or the supported nickel catalysts, or the particular reduced prepared catalyst, provided the film does not evaporate too rapidly at ordinary temperatures. If the fluid is in a liquid state, it may be sprayed on or poured over the catalyst or the catalyst may be dipped into the liquid bath or, if the fluid is in a vapor state, the vapor may be condensed or passed over the catalyst so as to condense on the catalyst. In the vapor phase, the best results have been secured by passage of steam over the catalyst mass. Any method of applying, depositing or condensing the fluid may be employed, although the vapor phase is preferable. Steam or water have proven very effective stabilizers.

Catalysts which have been thus stabilized or in which the activity has been retained by subjection to the foregoing process may be easily handled in air without danger to the operator and simply prepared for use by drying them in the presence of hydrogen at elevated temperatures.

If steam or water are used as the stabilizing agent, drying at reasonably low temperatures in nitrogen or any inert gas is all that is necessary to restore the catalyst to its full activity. However, if drying takes place in air then reactivation in hydrogen at temperatures between 45° C. and 100° C. may be necessary to restore the catalyst to full activity. If drying is performed at the lower temperatures the time required to restore the catalyst to almost complete activation is longer than at the higher limits, for example, overnight treatment of the wetted catalyst with hydrogen at 84° C. has been found sufficient.

We claim:

1. A method of stabilizing reduced nickel catalysts which comprises condensing steam to form a water film on the surface of the catalyst and evaporating the film with air.

2. A method of stabilizing reduced nickel catalysts which comprises depositing a water film on the surface of the catalyst, and evaporating the film with air.

3. A method of treating a pyrophoric reduced metal catalyst agent comprising the steps of wetting said agent with water to form an inert surface film of liquid thereon and exposing said wetted agent to the action of air for a sufficient time to permit at least partial evaporation of said surface film.

4. A method of stabilizing a pyrophoric reduced metal catalyst agent comprising the steps of wetting said agent by condensing steam thereon to form an inert surface film of liquid and exposing said wetted agent to air, for a sufficient time to permit at least partial evaporation of said surface film.

5. A method of stabilizing a pyrophoric reduced nickel catalyst comprising the steps of wetting said agent by condensing steam on the surface of said agent, and exposing said wetted agent to the action of air for a sufficient time to permit at least partial evaporation of the resulting liquid surface film.

6. A method of stabilizing a pyrophoric reduced nickel catalyst comprising the steps of wetting said catalyst with water to form an inert surface film thereon and exposing said wetted agent to the action of air for a sufficient time to permit at least partial evaporation of said surface film.

JACOB ELSTON AHLBERG.
CLARENCE F. HISKEY.

REFERENCES CITED

The following references are of record in the file of this patent:

UNITED STATES PATENTS

| Number | Name | Date |
|---|---|---|
| 1,431,982 | Richter | Oct. 17, 1922 |
| 1,893,979 | Bennett et al. | Jan. 10, 1933 |
| 2,166,183 | Signaigo | July 18, 1939 |
| 2,205,552 | Arnold | Jan. 25, 1940 |
| 2,257,800 | Hawk | Oct. 7, 1941 |

FOREIGN PATENTS

| Number | Country | Date |
|---|---|---|
| 171,976 | Great Britain | Oct. 4, 1921 |

OTHER REFERENCES

Berkman et al., "Catalysis," Rheinhold Pub. Co., N. Y., 1940, pp. 253, 260, 261.